No. 664,314. Patented Dec. 18, 1900.
F. E. CORWIN.
COOKING UTENSIL.
(Application filed Aug. 17, 1900.)
(No Model.)

WITNESSES
Chas. E. Wiener
R. A. Parker

INVENTOR
Frank E. Corwin
By Parker & Burton
Attorneys.

THE NORRIS PETERS CO., PHOTO-LITHO., WASHINGTON, D. C.

UNITED STATES PATENT OFFICE.

FRANK E. CORWIN, OF DETROIT, MICHIGAN, ASSIGNOR OF ONE-HALF TO HARRY S. AYRES, OF SAME PLACE.

COOKING UTENSIL.

SPECIFICATION forming part of Letters Patent No. 664,314, dated December 18, 1900.

Application filed August 17, 1900. Serial No. 27,120. (No model.)

*To all whom it may concern:*

Be it known that I, FRANK E. CORWIN, a citizen of the United States, residing at Detroit, county of Wayne, State of Michigan, have invented a certain new and useful Improvement in Cooking Utensils; and I declare the following to be a full, clear, and exact description of the invention, such as will enable others skilled in the art to which it pertains to make and use the same, reference being had to the accompanying drawings, which form a part of this specification.

My invention relates to cooking utensils, and is more particularly adapted to that class of frying-pans which are used for cooking eggs or similar articles of food; and its object is to provide a pan in which each article being cooked has a receptacle for itself and any two are prevented from running together or uniting in the cooking process.

It also has such other objects as are hereinafter specified and claimed.

Figure 1:
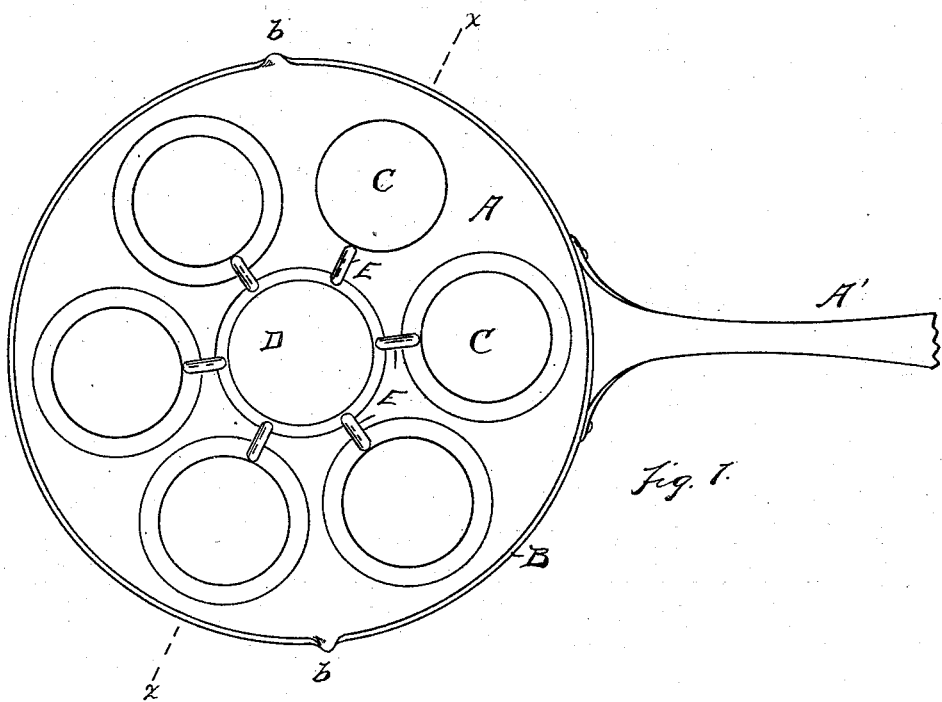
Figure 4:
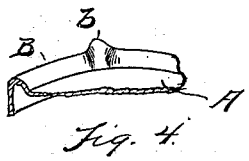
Figure 2:
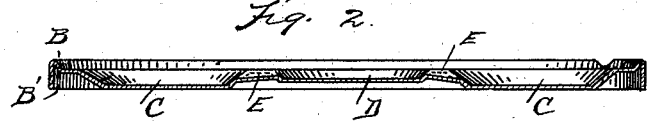
Figure 3:

In the drawings, Figure 1 is a plan view of the pan. Fig. 2 is a cross-sectional view on lines $xx$. Fig. 3 is a detail sectional view, on an enlarged scale, of a portion of Fig. 2. Fig. 4 is an enlarged detail of a portion of Fig. 1.

Similar letters refer to similar parts.

In the drawings, A represents the body of the pan, having the ordinary handle A'. The pan is preferably constructed of sheet metal by stamping, although it may be made by casting. Surrounding the whole pan is a raised ledge B, which has upon opposite sides two lips $b\ b$ for pouring. One of these is shown on an enlarged scale by Fig. 4. The bottom of the pan is flat, with the exception of a circumferential series of shallow depressions C C and a central depression D. These are all shown in cross-section in Fig. 2, the bottom of the depressions C C being flush with the lower edge B' of the rim B, which is preferably made by turning the outer edge substantially perpendicular to the plane of the pan. It thus results that in resting upon a flat heating-surface the lower edge of the rim B', together with the flat portions of the depressions C C, rest simultaneously upon the heating-surface. The object of the depressions C C is to cook each individual article and prevent their running together. In order to furnish a proper cooking menstruum therefor, I form a central depression D, which is preferably about half the depth of the depressions C C, and I also form channels E E, leading from the central depression into the depressions C C. The depressions or channels E E preferably do not commence at a level with the bottom of the depression D, but are slightly above it, as shown in cross-section, Fig. 3.

In operation articles to be cooked may be placed in each of the depressions C C, and butter or other cooking menstruum may be placed in the depression D, which in melting will run into the depressions C C, and thus cook each article separately. As the channels E E are preferably not deep enough to reach quite to the bottom of the depression D, the transfer of the menstruum from depression D to depressions C C can be governed by slightly tilting the pan. The circumferential ledge B retains any overflow, which may be turned off through the lips $b\ b$ in the ordinary manner.

What I claim is—

1. As a new article of manufacture, a cooking utensil having a multiplicity of independent non-connecting circumferential depressions of like character, a central depression of less depth than the circumferential depressions, and connecting-channels communicating between the central depression and each of the circumferential depressions, substantially as described, 2. In a cooking utensil, the combination and arrangement of circumferential separate independent depressions, a central depression of less depth, a series of channels leading from the central depression one to each circumferential depression, said channels being deflected toward the circumferential depressions and of less depth than the central depressions, substantially as and for the purpose described.

In testimony whereof I sign this specification in the presence of two witnesses.

FRANK E. CORWIN.

Witnesses:
CHARLES F. BURTON,
ELLIOTT J. STODDARD.